Patented June 2, 1953

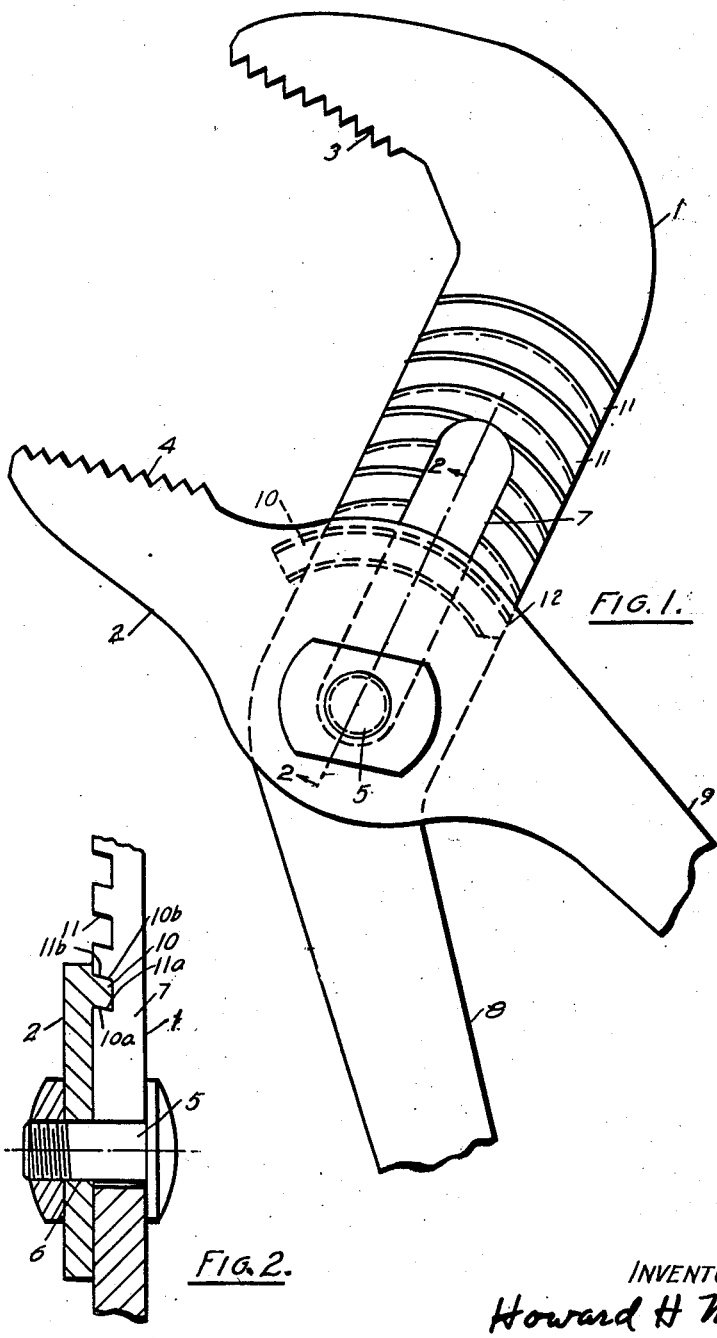

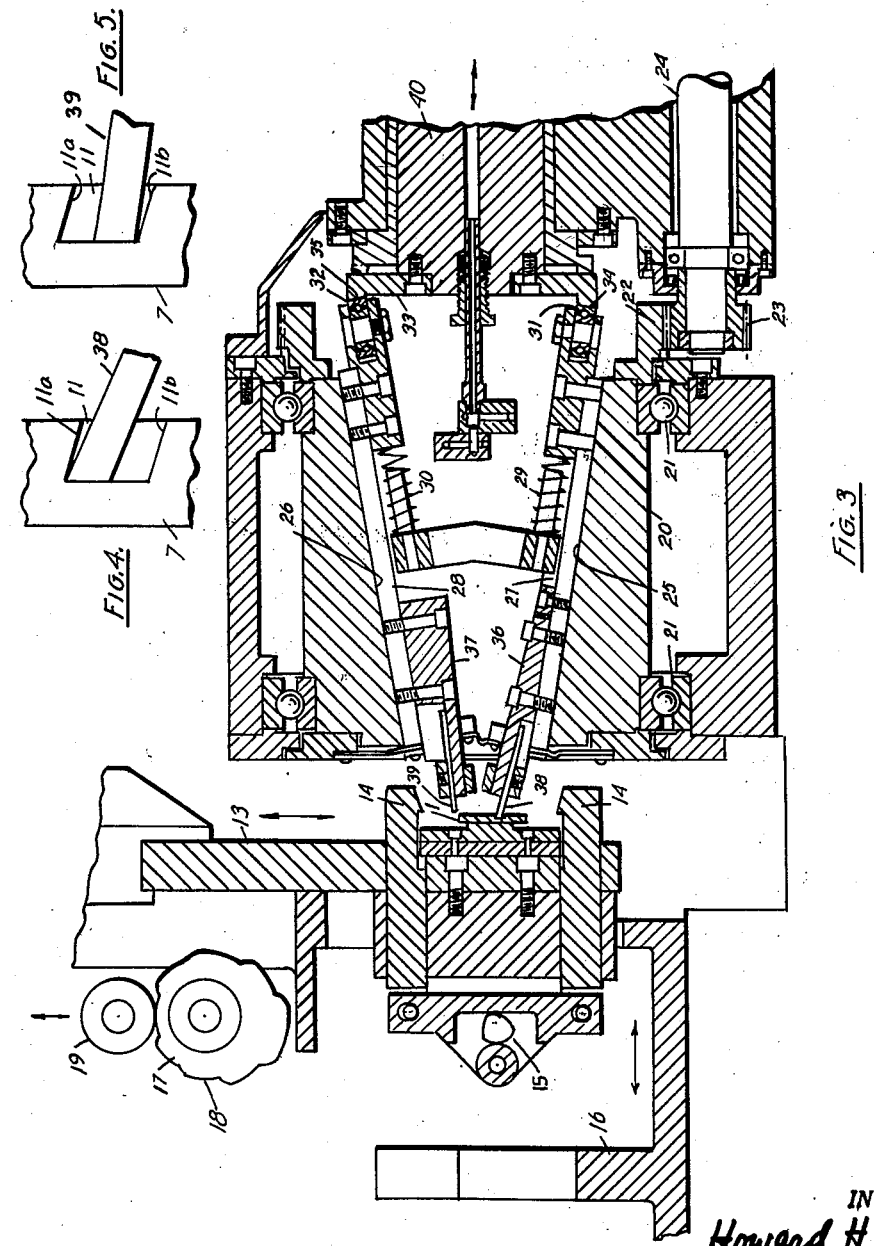

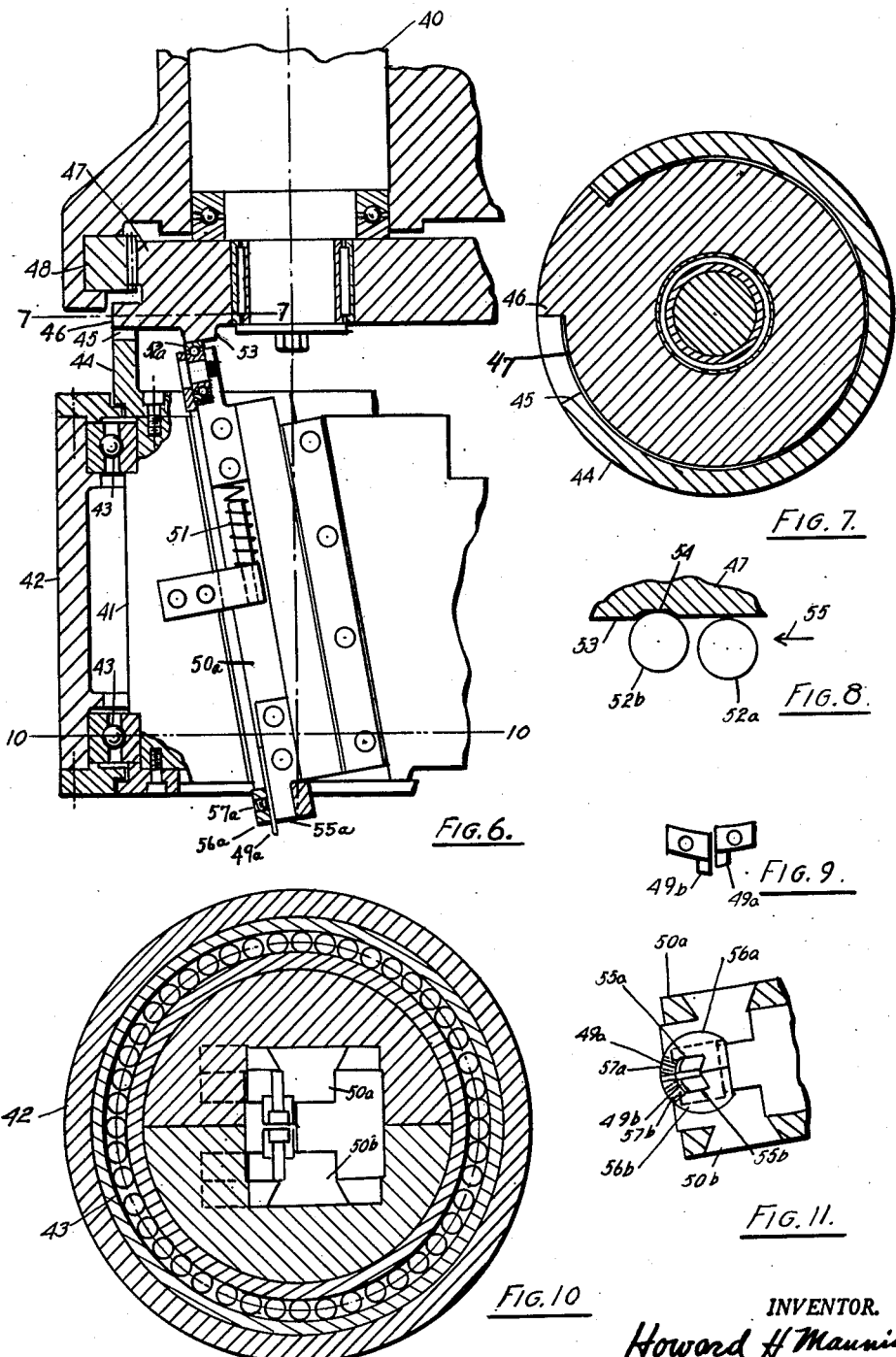

2,640,398

UNITED STATES PATENT OFFICE 2,640,398

MACHINE FOR CUTTING SLANT SIDED ARCUATE GROOVE ELEMENTS

Howard H. Manning, Meadville, Pa.

Application February 15, 1951, Serial No. 211,035

5 Claims. (Cl. 90—11)

This invention is intended to facilitate the machining of undercut or slant sided arcuate tongue and groove elements forming the joint elements in hand tools such as pliers. A pair of cutting tools are used, one for each side of the element, and each of which is advanced relative to the work along a way inclined at the slope of the side of the element it cuts. The cutting tools are alternately advanced into engagement with the work and retracted clear of the work so that while one of the tools is cutting, the other is retracted. Either rotary or oscillatory cutting strokes may be used. Further objects and advantages appear in the specification and claims.

In the drawing, Fig. 1 is a side view of a pair of pliers having slant sided tongue and groove elements forming the pivotal connection between the plier members, Fig. 2 is a section on line 2—2 of Fig. 1, Fig. 3 is a sectional side elevation of a rotary machine for cutting the tongue and groove elements, Figs. 4 and 5 are enlarged fragmentary views showing the relation of the alternately engageable cutting tools to the sides of one of the groove elements, Fig. 6 is a fragmentary side elevation of an oscillatory machine for cutting the tongue and groove elements, Fig. 7 is a section on line 7—7 of Fig. 6, Fig. 8 is a section through the cam controlling the advancing and retracting of the cutters, Fig. 9 is a view of the cutters, one being in the cutting and the other in the retracted position, Fig. 10 is a section on line 10—10 of Fig. 6, and Fig. 11 is an end view of the cutters.

In Figs. 1 and 2 is shown a tool having arcuate tongue and groove elements. The tool comprises crossed pivoted members 1 and 2 respectively provided with jaws 3 and 4 at one side of bolt 5 extending through an opening 6 in the member 2 and through an elongated slot 7 in the member 1. On the opposite side of the bolt, the members are provided with handles 8 and 9. On the member 2 is an arcuate rib 10 receivable in any one of a plurality of arcuate grooves 11 in the member 1. The width of the jaw opening is adjusted by sliding the member 2 carrying the bolt 5 along the slot 7 until the pointed or beveled end 12 of the rib 10 comes opposite the desired groove 11. From one aspect the rib 10 and the groove 11 are tongue and groove joint elements on adjacent faces of the members 1 and 2.

To prevent lateral offsetting of one of the jaws relative to the other, which would tend to move the gripping surfaces of the jaws out of opposed relation and to disengage the tongue and groove elements, the tongue and groove elements 10 and 11 are provided with inclined sides or faces 10a, 11a, on the working pressure side. The faces 10a, 11a which engage in any selected position of the pliers are slanted in the direction to provide an inter-lock preventing lateral offsetting movement of the jaws relative to each other. The engaging pressure on faces 10a, 11a exerts a force causing the members to cling together. The opposite faces 10b, 11b, which do not engage under working conditions are generally parallel to the faces 10a, 11a, so that there is no tendency for the tongue and groove elements to jam if the jaws are forcibly offset. The foregoing tongue and groove elements, with slanted or undercut sides are typical of the tongue and groove elements, which can be machined by the apparatus presently to be described.

In the machine shown in Fig. 3, the plier member 1 is removably held against a slide 13 by clamps 14 actuated by a cam 15. The clamps 14 will of course be shaped most effectively to grip the plier member 1, which is mounted vertically with the handle 8 extending upward. The slide 13 is mounted on a carriage 16 which is retractable from the position shown so as to make the front side of the slide more accessible for loading and unloading. The carriage 16 is shown in the normal operating position. The vertical position of the slide is indexed by a step cam 17 having five steps 18 cooperating with a roller 19. The five steps 18 correspond to the five grooves 11 to be machined in the plier member 1. The number of steps ordinarily corresponds to the number of grooves to be machined. The parts so far described serve to hold and index the plier member 1 in successive positions, so that each of the grooves 11 can be successively machined. The details of the holding and indexing means are well understood and need not be further illustrated.

The cutting tools for machining the grooves 11 are mounted in a rotary cutting head 20 journaled in bearings 21 and driven through a gear 22 fixed to the head and a pinion 23 fixed to a power shaft 24. Within the cutting head are inclined guide-ways 25 and 26 respectively having the same inclination as the faces 11a and 11b of the grooves. In the present machine where the faces 11a and 11b are slanted at the same slope, the inclination of the guide-ways 25 and 26 with respect to the center line of the head 20 is the same. In the guide-ways 25 and 26 are slides 27 and 28, respectively, urged toward the right as viewed in Fig. 3 by compression springs 29 and 30. At the extreme right hand end, the slides 27 and 28 have rollers 31 and 32 which engage a non-rotating face cam 33. The face cam has a cam surface 34 cooperating with the rollers 31 and 32 during the time when each of these rollers is in the lowermost position to advance the slide associated with the roller toward the work. The face cam also has a cam surface 35 cooperating with the rollers 31 and 32 which permits retraction of the respective rollers by the springs 29 and 30 whenever the roller occupies the upper position as viewed in Fig. 3, i. e. that part of the revolution in which the cutters are to be retracted. The retraction permitted by the cam surface 35 is such that the slides 27 and 28 are in an inactive or non-cutting position whenever the slides are in the upper position. At the front end of the slides 27 and 28 (the end opposite the rollers 31 and 32) are tool holders 36 and 37 carrying arcuate cutting tools 38 and 39 for respectively machining the sides 11a and 11b of the grooves 11. As shown in Fig. 4, the tool 38 for machining the side 11a is inclined to the center line of the cutting head 20 to a greater extent than the guide 25. It will also be noted from Fig. 5 that the cutting tool 39 is inclined to the center line of the cutting head 20 to a lesser extent than the guide 26. The purpose of this is to provide clearance to obtain proper cutting action of the tools. The inclination of the cutting tools 38 and 39 does not determine the inclination of the sides cut by the respective tools. That is determined by the inclination of the guides 25 and 26. The inclination of the cutting tools with respect to the guides is for the sole purpose of facilitating the cutting action and not for the purpose of determining the slope of the cut. The groove cutting tools are fed toward the work by a plunger 40 fixed to the face cam 33. The plunger is suitably controlled so as to advance the cutting tools toward the work and to stop the advance and to retract the cutting tools when the desired depth of groove is cut. The details for advancing and retracting the plunger 40 are not critical and various expedients are known.

In the use of the machine, the plier member 1 is clamped in the slide 13 by tightening the clamps 14 through the cam 15 and the slide is advanced by means of the carriage 16 to the position illustrated in Fig. 3. The index cam 17 will either be in the position illustrated in Fig. 3 or 180° from that position. During the loading and clamping of the plier member, the plunger 40 will be retracted. As soon as the plier member is loaded and clamped, the plunger 40 is started in operation and slowly advances the cam 33 toward the plier member. While the face cam 33 is advancing, the rollers 31 and 32 cooperate with the cam surfaces 34 and 35 to respectively advance and retract the cutting tools 38 and 39 alternatively. The cam surfaces 34 and 35 are so proportioned that the cutting tool which is advanced engages the plier member throughout the entire length of the groove to be cut, while the cutting tool which is retracted is at all times clear of the plier member. In effect, the retracted cutting tool hops over the plier member. As the face cam 33 advances, the cutting tools 38 and 39 alternately engage the plier member and respectively cut the faces 11a and 11b of a single groove. When the desired depth of groove is cut, the plunger 40 is retracted until the lowermost of the cutting tools 38 and 39 moves clear of the groove 11. By rotating the index cam 17 one step relative to the roller 19, the slide 13 is moved vertically the necessary distance to properly space a succeeding groove 11 from a groove which has been previously machined and the operation is repeated until all five of the grooves 11 have been machined.

In Figs. 6 to 11, inclusive, is shown an oscillatory cutting head which can be substituted for the rotary cutting head 20 in Fig. 3. The machine with the oscillatory cutting head can use the same fixture and indexing arrangement for holding the plier member stationary and in position to machine the grooves 11. The machine can also use the same plunger 40 for advancing and retracting the cutting head.

Referring to Fig. 6, the oscillatory cutting head indicated at 41 is journaled in a frame 42 by bearings 43. Fixed to the head is a cylindrical drive or clutch member 44 having an elongated slot 45 receiving a projection 46 on a gear 47 which is oscillated by a reciprocating rack 48. There is sufficient clearance between the projection 46 and the slot 45 so that upon reversal of the gear 47 at the end of each oscillation, the driving member 44 and the head 41 attached thereto remain stationary until the lost motion between the projection 46 and the slot 45 is taken up. This lost motion is utilized to advance and retract cutters 49a and 49b for machining respectively the sides 11a and 11b of the grooves 11. The cutters 49a and 49b are respectively mounted on slides 50a and 50b, which are inclined in the cutting head 41 at the same slope as the sides 11a and 11b of the groove to be machined. As in the previously described machine the slides are urged toward the right by compression springs 51 which hold rollers 52a and 52b against the face cam 53 on the gear 47. The face cam 53 has a depression 54 which alternately receives the rollers 52a and 52b as the lost motion between the projection 46 and the slot 45 is taken up in opposite direction of rotation. When the gear 47 is rotating in the direction of the arrow 55 in Fig. 8, the roller 52b drops into the depression 54 and retracts slide 50b and the cutting tool 49b carried thereby so that the cutting tool 49b is clear of the work. When the gear 47 rotates in the reverse direction, the initial movement of the gear before the lost motion between the projection 46 and the slot 45 is taken up moves the roller 52b out of the depression 54 and the roller 52a into the depression 54 thereby advancing the cutter 49b and retracting the cutter 49a. With this arrangement, it is obvious that upon the forward stroke of an oscillation of the gear 49, one of the cutters is operative while on the reverse stroke the other cutter is operative, as in the previously described machine, so that upon a complete back and forth oscillation of the gear 47 one cut is made on each side of the groove.

The cutting tools 49a and 49b are mounted on the ends 55a and 55b of the slides 50a and 50b by C clamps 56a and 56b provided with set screws 57a and 57b for holding the cutting tools against the ends of the slides so as to have the desired rake and chip clearance.

As shown in Fig. 11, the slides 50a and 50b are side by side and the cutters 49a and 49b are also side by side. This permits a greater variation in the inclination of the slides. While for the machining of grooves 11 where the sides 11a and 11b are parallel to each other, the slides 50a and 50b would have the same inclination, it is possible to have one of the slides, for example the slide 50b, at an opposite inclination so that groove 11 would then be a full dove-tail groove. In both machines it is the inclination of the slides which are advanced relative to the work which determines the slope of the sides of the groove and it is not necessary that the groove have opposite sides of the same slope. In both machines, the slides are advanced along the guide ways in proportion to the depth of the cut. This is necessary because if the tools remained at the same point on the guide ways the shape of the groove would be determined by the shape of the cutting tools and not by the inclination of the slides.

In both machines, the work has been held stationary and the cutting head rotated or oscillated relative to the work. It would obviously be possible to reverse the arrangement and have the cutting tools non-rotary while the work either rotated or oscillated relative to the cutting tools. However, with such an arrangement it would be necessary that the face cams rotate or oscillate in synchronism with the work since the relative position of the face cams with respect to the cutting tools is relied upon to advance and to retract the tools as required. When the face cams and work are stationary it can be considered that these are synchronized at zero speed. Synchronization at some other speed would not change the operation.

What I claim as new is:

1. Apparatus for machining slant sided arcuate grooves extending across work of less width and greater length than the diameter of the grooves, comprising a holder for the work in which the grooves are to be machined, a cutting head having an axis normal to the work, a pair of guide ways in the cutting head respectively inclined to the axis at the angle of one and the other sides of the grooves, cutting tools slidably mounted in each of the guide ways for respectively machining one and the other sides of the grooves, means for effecting relative rotation of the cutting head and work, cam means synchronized with the work for alternately advancing one and then the other of the cutting tools into the work while retracting the other and then the one of the cutting tools clear of the work, and means for feeding the cutting tools along the guide ways toward the work whereby the alternately advanced tools progressively cut into the work at angles determined by the inclination of the guide-ways.

2. Apparatus as claimed in claim 1 in which the means for effecting relative rotation of the cutting head and the work reverses at a travel greater than the length of the grooves, but less than a complete revolution.

3. Apparatus for machining slant sided arcuate grooves extending across work of less width and greater length than the diameter of the grooves, comprising a holder for the work in which the grooves are to be machined, a cutting head having an axis normal to the work, a pair of guide ways in the cutting head respectively inclined to the axis at the angle of one and the other sides of the grooves, slides in each of the guide ways carrying cutting tools for respectively machining one and the other side of the grooves, means for effecting relative rotation of the cutting head and the work, cam means synchronized with the work and cooperating with the slides for advancing one and then the other of the cutting tools into the work while retracting the other and then one of the cutting tools clear of the work, and means for feeding the cam means relative to the guide ways toward the work whereby the alternately advanced tools progressively cut into the work at angles determined by the inclination of the guide ways.

4. Apparatus for machining slant sided arcuate grooves extending across work of less width and greater length than the diameter of the grooves, comprising a holder for the work in which the grooves are to be machined, a cutting head having an axis normal to the work, a pair of guide ways on the cutting head having an inclination to the axis of the cutting head corresponding to the inclination of the sides of the grooves, a pair of tools slidably carried on the guide ways, means for oscillating the cutting head through an arc greater than the length of the groove, cam means for alternately retracting one of the tools clear of the work and advancing the other tool into the work at each reversal of the cutting head, and means for feeding the cutting tools along the guide-ways toward the work whereby the alternately advanced tools progressively cut into the work at angles determined by the inclination of the guide-ways.

5. Apparatus for machining slant sided arcuate grooves extending across work of less width and greater length than the diameter of the grooves, comprising a holder for the work in which the grooves are to be machined, a cutting head having an axis normal to the work, a pair of guide ways in the cutting head respectively inclined to the axis at the angle of one and the other sides of the grooves, slides in each of the guide ways carrying cutting tools for respectively machining one and the other side of the grooves, means for oscillating the cutting head through an arc greater than the length of the grooves, cam means cooperating with the slides to determine the position of the cutting tools relative to the work, said cam means alternately retracting one of the tools clear of the work and advancing the other tool into the work at each reversal of the cutting head, and means for feeding the cam means relative to the guide ways toward the work whereby the alternately advanced tools progressively cut into the work at angles determined by the inclination of the guide ways.

HOWARD H. MANNING.

References Cited in the file of this patent

UNITED STATES PATENTS

| Number | Name | Date |
|---|---|---|
| 1,250,320 | Kingsbury | Dec. 18, 1917 |

FOREIGN PATENTS

| Number | Country | Date |
|---|---|---|
| 215,390 | Great Britain | Sept. 18, 1924 |